Jan. 8, 1929.

G. E. OSBORNE 1,697,928

PHOTOGRAPHIC EXPOSURE METER

Original Filed July 14, 1925    2 Sheets-Sheet 1

Inventor
Guy E. Osborne
By R. J. Whitaker
Attorney

Jan. 8, 1929. 1,697,928
G. E. OSBORNE
PHOTOGRAPHIC EXPOSURE METER
Original Filed July 14, 1926  2 Sheets-Sheet 2
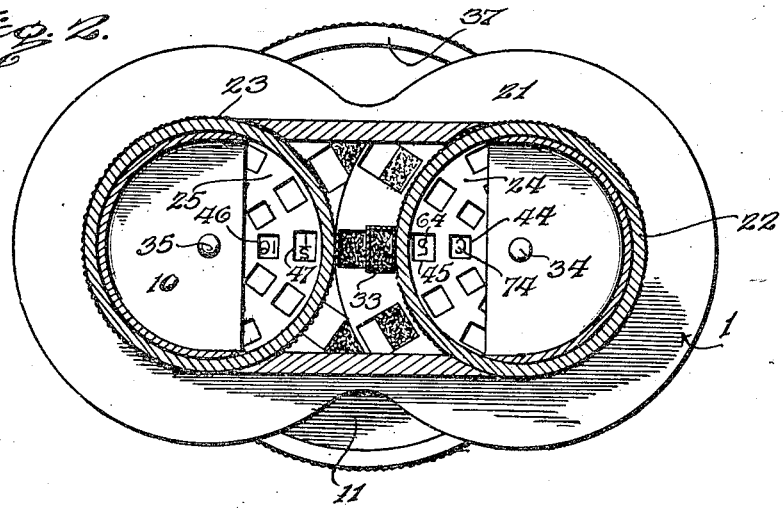
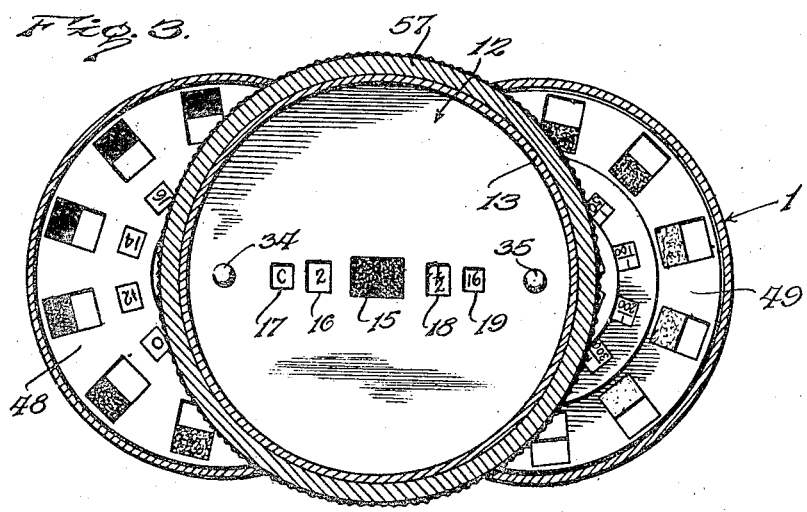
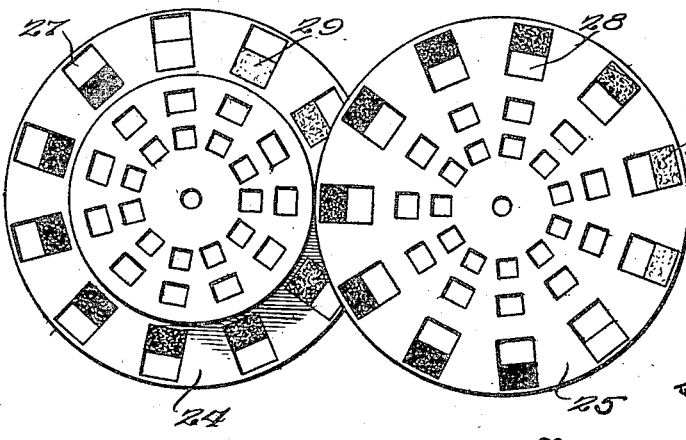
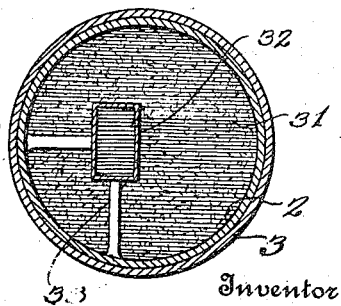
Inventor
Guy E. Osborne
By
R. J. Whitaker Attorney Patented Jan. 8, 1929.

1,697,928

UNITED STATES PATENT OFFICE.

GUY E. OSBORNE, OF CHAUNCEY, OHIO.

PHOTOGRAPHIC-EXPOSURE METER.

Application filed July 14, 1926, Serial No. 122,366. Renewed November 22, 1928.

This invention relates to improvements in photographic exposure meters and has as its general object to provide a meter of this class which will be capable of ready employment to accurately indicate the length of exposure period in accordance with the class or speed of film or plate employed, the size of stop, and likewise in accordance with the intensity of the light reflected from the object to be photographed. Heretofore, exposure meters have been designed with the object in view of calculating the exposure period in accordance with the intensity of the prevailing light in general but such photographic exposure meters have been found unsatisfactory and inaccurate as the period exposure does not always depend upon the intensity of the light which illuminates the subject, as the sole factor. In fact, it is well known that photographers will endeavor to photograph and bring out the shadows and, as the common expression among photographers goes, "let the high lights take care of themselves." With this in view, the present invention has as one of its important objects to provide an exposure meter in the use of which determinations will be arrived at in accordance with the light reflected from a portion of the object or scene to be photographed. Therefore, the invention contemplates the provision of an exposure meter in which all of the readings determining the conditions of exposure are in accordance with the intensity of the rays of light reflected from a portion of an object or scene to be photographed and which portion is selected at the discretion of the photographer. In this respect, the invention contemplates overcoming the disadvantages which likewise attend the use of exposure meters which depend on the strength of the light falling directly upon the object to be photographed.

The ordinary exposure meter makes no provision for determinations of exposure conditions where a wide range of plates or films of different classes or speeds may be employed and, therefore, the invention has as a further object, to provide an exposure meter in which the speed of the sensitized medium, whether it be a plate or film, is one of the determining factors in the use of the meter so that more accurate results may be conveniently obtained.

The meter embodying the invention is intended to be focused at a portion of the object or scene to be photographed and means is provided for focusing and controlling a monochromatic image of one part of the portion of the object in focus on transparent screen elements of constant and varying densities and adjustable to be selectively overlapped and to focus diffused light rays of a corresponding color onto other selectively overlapped screen elements reflected from the other focused part of the object, an adjustment of certain members which carry the said transparent screen elements permitting of the photographer matching the shades and, by means to be presently explained, immediately determining automatically the period of exposure of the class of film or plate employed and in accordance with the stop decided on.

In the accompanying drawings:

Figure 2 is a vertical transverse sectional view taken substantially on the line 2—2 of Figure 1, looking in the direction indicated by the arrows.

Figure 3 is a similar view taken substantially on the line 3—3 of Figure 1, looking in the direction indicated by the arrows.

Figure 5 is a similar view illustrating other transparent film-carrying members and their relative arrangement.

Figure 6 is a vertical transverse sectional view taken substantially on the line 6—6 of Figure 1, looking in the direction indicated by the arrows, and illustrating the light ray diffusing screen.

Figure 1:
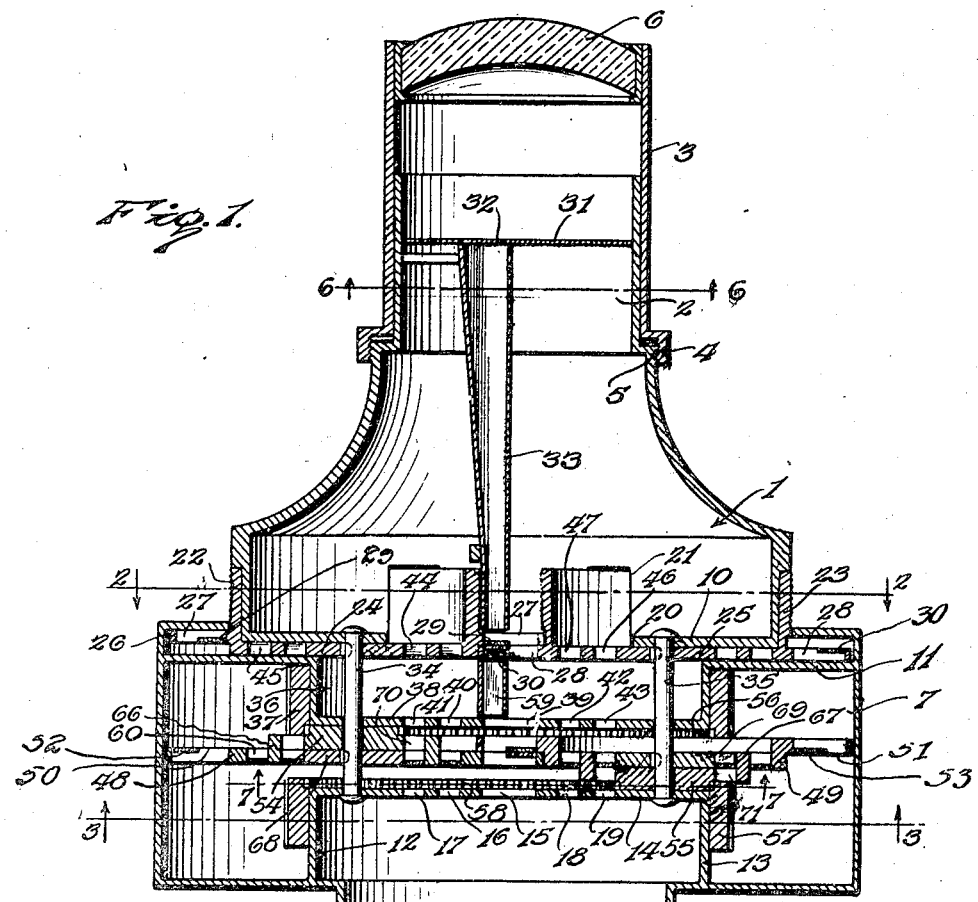
Figure 1 is a horizontal sectional view through the exposure meter embodying the invention.

The meter comprises a casing which is indicated in general by the numeral 1 and which may be of any suitable exterior contour to accommodate the component parts of the meter which are mounted therein. However, the casing is provided at its front with a barrel extension 2 onto which is rotatably fitted a lens barrel 3 having threaded engagement at its rear end, as at 4, with a threaded portion 5 of the casing at the inner end of the barrel extension 2, whereby to permit of focusing of a short focus objective lens indicated by the numeral 6. The casing is provided intermediate its front and rear ends with two approximately cylindrical portions 7 which are arranged side by side and communicate at their relatively adjacent sides with each other, and an eye piece 8 is located at the rear of the casing and has mounted therein a high power magnifying lens 9, the focal axis of which is in alinement with the focal axis of the objective lens 6.

A partition wall 10 is provided within the casing immediately at the front of the cylindrical portions 7 of the casing, and another partition wall 11 is likewise provided within the casing in rear of the wall 10. The rear wall of the portions 7 of the casing is formed to provide a cylindrical drum like extension 12, the circumscribing wall of which is indicated by the numeral 13, and the front wall of which is indicated by the numeral 14, this latter wall being in the focal plane of the lens 9. As will be observed by reference to Figs. 1 and 3, the wall 14 is formed centrally with a rectangular opening which is indicated by the numeral 15 and with openings 16 and 17 located at one side of the opening 15 and of rectangular form, the wall being likewise provided with other openings 18 and 19 at the other side of the opening 15 and of rectangular form. All of these openings are arranged in a horizontal line and are all exposed on a much enlarged scale to the vision of the user of the meter when viewed through the lens 9 and eye piece 8. The overlapping transparent screen elements and certain indicia are visible through these openings under conditions to be presently described.

The wall 10, opposite the inner end of the barrel extension 2 of the casing is provided with an opening 20. The outer side of the portion of the casing in front of the cylindrical portions 7 is of substantially semi-cylindrical contour, as shown in Fig. 2, and slots 21 are provided at the ends of the said semi-cylindrical portions so as to accommodate annular knurled finger flanges 22 and 23 which are respectively carried by and constitute an integral part of discs 24 and 25, which discs are most clearly shown in Figure 5 of the drawings. These finger flanges provide for selective rotative adjustment of the discs 24 and 25 and substantially the entire area of the disc 25 occupies a common plane, whereas the peripheral portion of the disc 24 which is indicated by the numeral 26, is offset in a forward direction, as shown in Figure 1, so that its said peripheral portion will overlap the peripheral portion of the companion disc 25. Rectangular openings 27 and 28 are formed in an annular series respectively in the discs 24 and 25 and these openings in the two discs are located in the peripheral portions thereof so that where the discs overlap at their said portions, selected ones of the openings may be brought into registration, two of the openings being shown in registration in Figure 1, within the bounds of the opening 20. The numeral 29 indicates transparent screen elements which are of rectangular form and one of which is arranged in a corresponding half of each of the openings 27 in the disc 24, so that there is an annular series of these screen elements and, as will be observed by reference to Figure 5, these screen elements are of gradually increasing density from one end of the series to the other. In the case of the disc 24, the screen elements may, for example, occupy the half of their respective openings 27 nearer the axis of the disc. Screen elements 30 are similarly arranged in the openings 28 in the disc 25 and are likewise of gradually increasing density from one end of the series to the other except that in the instance of this disc, the screen elements 30 are located in the outer halves of the respective ones of the openings 28 so that when the discs are relatively rotatably adjusted, any two selected screens 29 and 30 may be brought into overlapped relation, as clearly shown in Figure 1 and also Figure 5. As before stated, the rotation of the discs is effected through the medium of the knurled flanges 22 and 23 and it will be observed by reference to Figure 1, that the overlapping of the screen elements is brought about at one side of the focal axis of the lenses 6 and 9. It will likewise be observed that the halves of the registering openings which are occupied by screen elements are located at the opposite side of the focal axis of the said lenses. The reason for this arangement will now be made clear.

Arranged within the barrel extension 2 is a monochromatic light ray diffusing screen 31 which may be of any material which will permit a maximum amount of diffused light to enter the casing in rear of the screen. This light ray diffusing medium is of a primary color such for example as blue, and is translucent throughout and of uniform density throughout its entire area except for a small rectangular portion of its area indicated at 32, which is substantially transparent or clear. In other words, except for this portion, one surface is etched or otherwise treated so as to possess sufficient density to diffuse the light rays passing therethrough, the light rays from the lens 6 being permitted to pass more readily through the less dense area portion 32 as this portion is, as stated, clear. A semi-pyramidal light ray conducting tube or conduit 33 of rectangular form in cross section is arranged within the casing and has its forward or larger end positioned in precise registration with the clear area position 32 of the diffusing screen 31 and the rear end of this tube is presented directly opposite the overlapping screen elements 29 and 30, as shown in said Figure 1. Preferably, the interior of the tube 33 is surfaced a dead black to eliminate, as far as possible, reflection of the light rays passing therethrough, whereas the exterior surface of the tube is finished a brilliant white so as to provide the maximum reflection of light rays entering that portion of the casing from the lens 6 and through the screen 31, in which position the said tube is located.

The discs 24 and 25 are respectively fixed upon shafts 34 and 35 which are journaled at their forward ends in the partition wall 10 and at their rear ends in the front wall 14 of the extension 12 of the rear casing wall, the discs 24 and 25 being located immediately rearwardly of and, in fact, rotating in contact with and between the partition walls 10 and 11 at their relatively remote peripheral portions.

The partition wall 11 is provided with a rearward cylindrical drum-like extension 36 and rotatably mounted on the circumferential wall of this extension is a knurled adjusting ring 37, the upper and lower peripheral portions of which are exposed exteriorly at the top and bottom of the casing. The rear wall of the extension 36, which is indicated by the numeral 38, is provided with a rectangular opening 39 equal in area to the area of any of the openings in the discs 24 and 25 and positioned in front to rear alinement directly opposite the last mentioned openings when in registration, as clearly shown in Figure 1 of the drawings. The said wall 38 is likewise formed with openings 40 and 41 which are arranged at one side of the opening 39 and are of the same dimensions as and located in front to rear alinement with the openings 16 and 17 in the wall 14. Similarly, openings 42 and 43 are formed in the wall 38 at the other side of the opening 39 and respectively opposite the openings 18 and 19.

In order that light rays may pass the discs 24 and 25 when the openings 27 and 28 in said discs are in registration at their overlapping peripheral portions and illuminate certain light ray transmitting mediums which bear indicia, as will presently be explained, the disc 24 is formed with an annular series of rectangular openings 44 concentric to the shaft 34 and with a second series of openings 45 concentric to the series 44 and located between the same and the openings 27, and these openings 44 and 45 are respectively located opposite or in horizontal alinement with the openings 41 and 40 in the wall 38 when the disc 24 is in position with the respective one of its openings 27 in registration with one of the openings 28 in the disc 25. In a similar manner, the disc 25 is formed with an annular series of openings 46 concentric to the shaft 35 and a series of openings 47 concentric to the openings 46 and located between the same and the series of openings 28 and in horizontal alinement with the openings 43 and 42 respectively in the wall 38 in the adjusted position of the said discs 24 and 25.

Figures 4, 7:
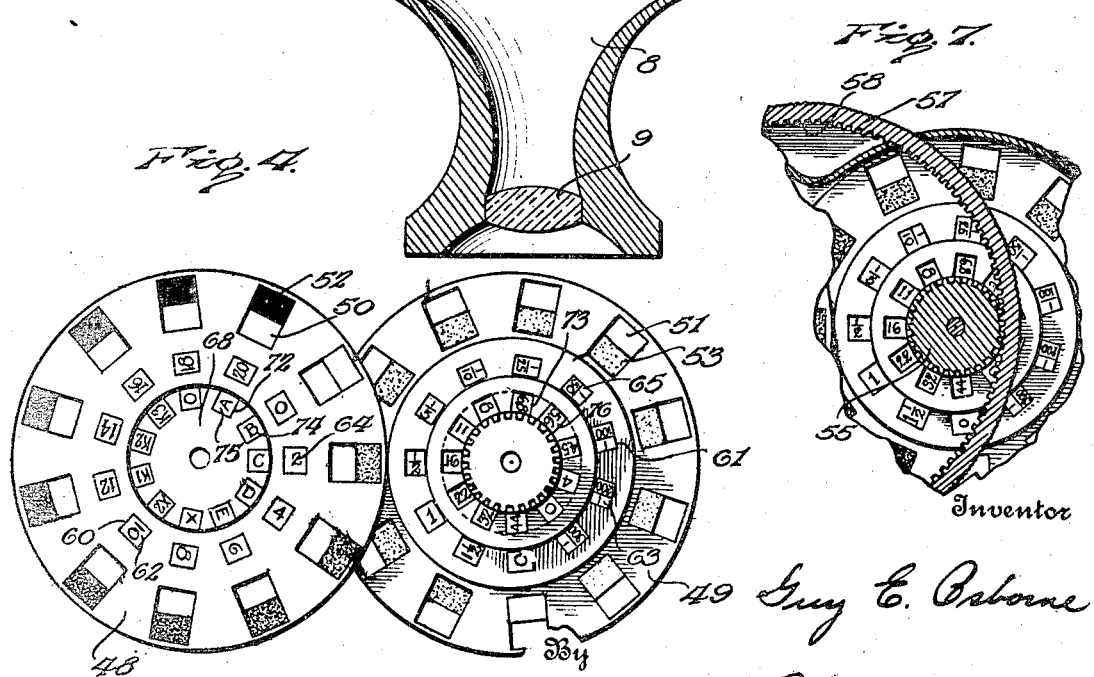
Figure 4 is a group view illustrating the general construction and arrangement of the transparent screen-carrying members and the dials associated therewith for indicating the class or speed of plate or film and the stop.
Figure 7 is a sectional view taken substantially on the line 7—7 of Figure 1, looking in the direction indicated by the arrows, and illustrating the means provided for relatively adjusting the members illustrated in Figure 4.

Discs 48 and 49 are rotatably mounted upon the shafts 34 and 35 respectively and these discs have their peripheral portions overlapped, as clearly shown in Figure 4 of the drawings. The said discs are provided respectively with rectangular openings 50 and 51, the openings of each disc being arranged in an annular series and the openings being of the same dimensions as the openings 27 and 28 in the discs 24 and 25. Transparent screen elements 52 and 53 respectively are mounted in the outer and inner halves of the openings 50 and 51 respectively so that, as in the case of the screen elements 29 and 30 of the discs 24 and 25, these screen elements 52 and 53 are arranged to be brought selectively into overlapping and registering relation to each other in the adjustment of the discs. The discs 48 and 49 are provided respectively at their centers and upon opposite faces, with pinions 54 and 55, and the knurled ring 37 heretofore referred to is provided with an internal gear 56 which meshes with the pinion 54 so that when this ring is manually rotated, rotary motion will be imparted to the disc 48. A knurled ring 57 is rotatably mounted upon the forward extension 13 of the rear casing wall and is provided with an internal gear 58 which meshes with the pinion 55 so that in the rotation of this ring, the disc 49 is rotatably adjusted. Likewise, as in the case of the discs 24 and 25, the discs 48 and 49 are so formed that their marginal portions will overlap, as clearly shown in Figures 1 and 4 of the drawings. The numeral 59 indicates a short extension of the light ray conducting conduit 33 extending between the periphery of the disc 25 and the wall 38 and supported by the latter so that the user of the meter may have an unobstructed view of the part of the image focused on the overlapping screen elements 50 and 51 through the medium of the light rays which have passed through the clear portion 32 of the light ray diffusing medium 31, with no interference on the part of rays which have passed through the other portion of the area of said light ray diffusing medium. At this point it will be observed that where screen elements 52 and 53 of the discs 48 and 49 overlap and register opposite the opening 39 in the wall 38, they are positioned at one side of the conduit 33 and its extension 59 so that these screen elements are tinted by the diffused colored light rays passing through the translucent area of the diffusing medium 31, and it will now be evident that by observing the part of the image focused and outlined on the overlapping screen elements 50 and 51 and simultaneously observing the shade of color imparted to the overlapping screen elements 52 and 53 which are at such time in the focal plane of the lens 9 with the screen elements 50 and 51, a comparison of the two surfaces may be made and the discs 48 and 49 rotatably adjusted through the medium of the knurled rings 37 or 57 or both in combination until the general shade of light of the screen elements 52 and 53 matches that of the image focused upon the screen elements 50 and 51. The disc 48 is formed with an annular series of small rectangular openings 60 which are concentric to the series of openings 50 in the disc and are positioned the same distance from the shaft 34 as are the openings 45 of the disc 24, and the disc 49 is formed with a similar series of openings 61 concentric to the series of openings 51 and located the same distance from the shaft 35 as are the openings 47 of the disc 25. Small transparencies 62 and 63 are positioned within the openings 60 and 61 respectively and the transparencies 62 bear ordinals, as indicated by the numeral 64, indicating whole seconds. The transparencies 63 in the openings 61 bear ordinals and fractions, as indicated at 65, denoting fractions of seconds.

Circular recesses 66 and 67 are formed respectively in the rear and front faces of the discs 48 and 49 and small circular discs 68 and 69 are fixed upon the shafts 34 and 35 respectively and are rotatable in the respective recesses 66 and 67. A series of openings 70 are formed in the disc 48 concentric to the openings 60 and between the same and the periphery of the pinion 54, and a similar series of openings 71 is formed in the disc 49, the openings of the two series being rectangular and of substantially the same dimensions as the openings 44 and 46 of the discs 24 and 25 respectively. The discs 68 and 69 are formed substantially at their peripheries with openings 72 and 73 respectively, which openings are arranged in an annular series in each instance, transparencies 74 being positioned within the openings 72 and bearing letters of the alphabet or other indicia 75 indicating the classes or speeds of plates or films in general use. In a similar manner, transparencies 76 are arranged within the openings 73 and bear ordinals indicating the camera stops.

The manner of using the exposure meter is as follows: Assuming that it is desired to ascertain the time period of exposure of a class C plate, the camera stop "16" having been decided on, the meter is focused at the object or image which it is desired to photograph, the barrel 3 being adjusted as required to obtain the desired focus, and the knurled ring 22 is then adjusted so as to rotate the disc 24 until the plate indicating letter "C" appears in the opening 17 in the wall 14. Likewise, in a similar manner, the knurled ring 23 is adjusted so as to rotate disc 25 until the stop indicating ordinal "16" appears in the opening 19 in the wall 14.

Next, the discs 48 and 49 are rotatably adjusted through the medium of the knurled rings 37 and 57 respectively until the "0" marks of the discs 48 and 49 appear at the openings 16 and 18 respectively. The knurled ring 57 is then slightly rotated toward the right to effect rotation of the disc 49 and in such rotation of the disc 49 successive ones of the screen elements 53 of gradually increasing density will be presented at the right hand side of the opening 15. In focusing the meter, a portion of the image is sharply defined upon the overlapping clear area of screen elements 50 and 51, which have been brought into position opposite the rear end extension of the light ray conducting conduit 33, and the rotation of the knurled ring 57 is continued until one of the screen elements 53 has been brought into the line of vision and which element is of an intensity equivalent to that of the image focused on the screen elements 50 and 51. When this has been accomplished, it will be observed that the transparency 65 which bears the fraction "½" is presented to the vision at the opening 18, indicating an exposure of one-half second. It will be recalled that the disc 48 has, in the meantime, remained stationary, so that the transparency 64 bearing the "0" mark will appear at the opening 16. If it should be found that, in the adjustment of the disc 49 through the rotation of the knurled ring 57, none of the light screens 53 are of sufficient density to match the shade of the image outlined on the overlapping clear screen portions 50 and 51, the disc is adjusted to position with the "0" mark of the transparency 63 appearing in the opening 18, and the disc 48 is adjusted through the medium of the knurled ring 37 until a screen element 52 of the proper density to match the image has been brought to position in front of the opening 15. At this point it may be stated that the screen elements 52 of the disc 48 are more sharply graduated as to their increasing density throughout the series than are the screen elements 53. As the series of transparencies 62 of the disc 48 are graduated to represent whole seconds, it may be found that no exact selection can be made because one of the screen elements 52 might be too dark and another might be too light to match the image, and in such event, the disc 48 is left at adjustment with the lighter or less dense one of the screen elements in the line of vision and the disc 49 is then rotated until one of the screen elements 53 of a density which, combined with the density of the screen element 52, will give the correct density to match the image, has been brought into overlapping relation with respect to the said screen element 52 which has been left in position in the line of vision. In this instance, for example, it might be found that a screen element 52 of the disc 48 which is opposite the whole second indicating numeral "2" is the proper one which when combined in overlapping relation with that one of the screen elements 53 which is opposite the "½" second transparency 63, will permit of exact matching of the focused image portion and this would indicate an exposure of two and one-half seconds.

It will be observed by reference to the discs 48 and 49, as shown in Figure 4, that the range of the meter in the illustrated embodiment is from 1/300 of a second to 21½ seconds, and it will be understood that this is sufficient to meet all ordinary requirements.

It will be observed that at no time are there any screen elements of the discs 48 and 49 in position to obstruct the passage of the light rays through the clear portion 32 of the light ray diffusing medium 31, the conduit 33, and to the eye piece 9 by way of the overlapping screen elements 29 and 30 through which the intensity of the part of the image is adjusted or regulated in accord with the sensitive medium and the camera stop employed. However, light rays which pass through the other portion of the light ray diffusing medium 31 are dissipated or diffused and lose their identity with, however, but little loss in intensity, so that these rays do not optically impress any portion of the image upon the overlapping screen elements 52 and 53 which are in the line of vision but merely register the shade of light increasing with the density of these screen elements and, as before stated, this enables the user to match this shade with the shade of the portion of the image which is sharply defined upon the overlapping screen elements 50 and 51.

The purpose of employing a diffusing medium such as the screen 31 of a primary color such as blue, is to produce a monochromatic optical impression on the overlapping screen portions 50 and 51 so that the visual color values of the object are distinctly displayed and the selection of the shade to match is readily accomplished.

While the exposure meter embodying the present invention is designed primarily for use in determining exposure periods for films and plates, it is also useful in determining time periods of exposure where bromide enlargements are made by projection, when used in connection with a special reflecting surface.

Having thus described the invention, what I claim is—

1. In a photographic exposure meter, a lens system including objective and eye piece lenses, transparent screen elements of varying density selectively adjustable to position in the focal axis of the lens system to control an optical impression of the object focused by the objective lens, a colored light ray transmitting and diffusing medium between the objective lens and the said screen elements to render the optical impression monochromatic, the said ray transmitting and diffusing medium having a clear area and a ray diffusing area, means for conducting light rays passing through the clear area directly to the said screen elements, other transparent screen elements of varying densities selectively adjustable to position in the focal axis of the lens system to receive direct and diffused light rays passing from the ray transmitting and diffusing areas of the said ray transmitting and diffusing medium, and indicator means automatically positioned in the focal plane of the eye piece lens, in the adjustment of the second mentioned transparent screen elements, for indicating the time period of exposure.

2. In a photographic exposure meter, a lens system including objective and eye piece lenses, transparent screen elements of varying density selectively adjustable to position in the focal axis of the lens system to control rays transmitted from the objective lens, other transparent screen elements of constant and varying densities likewise selectively adjustable to position in the focal axis of the lens system to receive rays transmitted from the objective lens, means for imparting color to the first mentioned rays without diffusing the same whereby to obtain a monochromatic optical impression of the object focused by the said objective lens upon the clear area of the second mentioned screen elements, means for imparting the same color to the second mentioned rays and diffusing the same whereby to transmit diffused rays to areas of varying density of the second mentioned screen elements, and whereby through adjustment of the screen elements a matching of the shades thereof may be effected; and indicator means automatically positioned in the focal plane of the eye piece lens in the adjustment of the second mentioned transparent screen elements, when the shades are matched, for indicating the time period of exposure.

3. In a photographic exposure meter, a lens system including objective and eye piece lenses, transparent screen elements of varying density selectively adjustable to position in the focal axis of the lens system to control an optical impression of the object focused by the objective lens, a colored light ray transmitting and diffusing medium between the objective lens and the said screen elements to render the optical impression monochromatic, the said ray transmitting and diffusing medium having a clear area and a ray diffusing area, a closed light ray conducting conduit extending between the clear area of the light ray transmitting and diffusing medium to the said screen elements, other transparent screen elements of the constant and varying densities selectively adjustable to position in the focal axis of the lens system to receive direct and diffused light rays passing from the ray transmitting and diffusing areas of the said ray transmitting and diffusing medium, and indicator means automatically positioned in the focal plane of the eye piece lens, in the adjustment of the second mentioned transparent screen elements, for indicating the time period of exposure.

4. In a photographic exposure meter, a lens system including objective and eye piece lenses, transparent screen elements of varying density selectively adjustable to position in the focal axis of the lens system to control an optical impression of the object focused by the objective lens, a colored light ray transmitting and diffusing medium between the objective lens and the said screen elements to render the optical impression monochromatic, the said ray transmitting and diffusing medium having a clear area and a ray diffusing area, means for conducting light rays passing through the clear area directly to the said screen elements, other transparent screen elements of constant and varying densities selectively adjustable to position in the focal axis of the lens system to receive direct and diffused light rays passing from the ray transmitting and diffusing areas of the said ray transmitting and diffusing medium, indicator means adjustable through adjustment of the first mentioned transparent screen elements to present, in the focal plane of the eye piece lens, indicia defining the class of sensitized medium to be exposed and the camera stop to be employed, and indicator means automatically positioned in the focal plane of the eye piece lens, in the adjustment of the second mentioned transparent screen elements, for indicating the time period of exposure.

5. In a photographic exposure meter, a lens system including objective and eye piece lenses, series of transparent screen elements independently adjustable to effect selective overlapping of their elements, the elements of each series being of varying density and, in their overlapped position, being in the focal axis of the lens system to control an optical impression of the object focused by the objective lens, similar series of transparent screen elements simultaneously independently adjustable to effect selective overlapping of their elements, the elements of each series being of constant and varying densities and likewise, in their overlapped position, being in the focal axis of the lens system, and in part laterally displaced with relation to the overlapped elements of the first mentioned series, a colored light ray transmitting and diffusing medium in the path of light rays passing from the objective lens to both said series of screen elements and having a clear area and a ray diffusing area, means for conducting the light rays passing through the clear area to the clear areas of the overlapped screen elements of the second mentioned series to provide for optical impression thereon of a monochromatic image of the object focused by the objective lens, the said transmitting and diffusing medium having another area for diffusing the rays passing to the overlapping varying screen element area of the second mentioned series, whereby through relative adjustment of the elements of the said series the overlapped elements of both areas may be matched as to shade, and indicator means automatically positioned in the focal plane of the eye piece lens in the adjustment of the second mentioned series of transparent screen elements, for indicating the time period of exposure.

6. In a photographic exposure meter, a lens system including objective and eye piece lenses, transparent screen elements of varying density selectively adjustable to position in the focal axis of the lens system to control an optical impression of the object focused by the objective lens, a colored light ray transmitting and diffusing medium between the objective lens and the said screen elements to render the optical impression monochromatic, the said ray transmitting and diffusing medium having a clear area and a ray diffusing area, a closed light ray conducting conduit extending between the clear area of the light ray transmitting and diffusing medium to the said screen elements, other transparent screen elements of constant and varying densities selectively adjustable to position in the focal axis of the lens system to receive direct and diffused light rays passing from the ray transmitting and diffusing areas of the said ray transmitting and diffusing medium, and indicator means automatically positioned in the focal plane of the eye piece lens, in the adjustment of the second mentioned transparent screen elements, for indicating the time period of exposure, said conduit having the inner surfaces of its walls of a substantially non-reflecting color and the exterior surfaces of its walls coated to reflect light rays.

7. In a photographic exposure meter, a lens system including objective and eye piece lenses, two series of transparent screen elements independently adjustable to effect selective overlapping of elements of each series in the focal axis of the lens system to control an optical impression of the object focused by the objective lens, the elements of each series being of varying density, a colored light ray transmitting and diffusing medium between the objective lens and the said screen elements, the said ray transmitting and diffusing medium having a clear area portion and a ray diffusing area portion, the clear area portion being positioned to tint the rays passing through the said screen elements without diffusion of the rays and render the optical impression monochromatic, a pair of rotatably adjustable discs between the said series of screen elements and the eye piece lens having mutually overlapping peripheral portions, the said portion of each disc having a series of apertures adapted to be brought selectively into registration in the relative adjustment of the discs, means whereby the discs may be independently adjusted, transparent screen elements of constant and varying densities arranged in the apertures in said discs and each respectively occupying substantially a half of the respective aperture, the said screen elements being so arranged as to provide for selective overlapping thereof in the focal axis of the lens system in the rotative adjustment of the discs, whereby to receive both direct and diffused light rays by the said transmitting and diffusing medium and be tinted in accordance with the composition of their densities, one of said discs having a series of transparencies corresponding in number to its series of apertures and radially opposite the same and bearing indicia indicating time exposure periods, the other disc having transparencies similarly arranged with respect to the apertures therein and bearing indicia indicating fractions of units of exposure periods, the transparencies of the two discs, by reason of their position with respect to the apertures of the discs, being adapted to be positioned in the focal plane of the eye piece lens and illuminated and rendered visible by the light rays passing from the light ray diffusing medium and thus indicating automatically the total time period of exposure, and other discs automatically rotated through adjustment of companion ones of the first mentioned discs and having transparencies arranged in annular series and bearing indicia, the indicia of one series of transparencies indicating the class of sensitized medium to be exposed in the camera and the indicia of the other series of transparencies indicating the camera stop, the said transparencies of the last mentioned discs being likewise in the focal plane of the eye piece lens.

8. In a photographic exposure meter, a lens system including objective and eye piece lenses, two series of transparent screen elements independently adjustable to effect selective overlapping of elements of each series in the focal axis of the lens system to control an optical impression of the object focused by the objective lens, the elements of each series being of varying density, a colored light ray transmitting and diffusing medium between the objective lens and the said screen elements, the said ray transmitting and diffusing medium having a clear area portion and a ray diffusing area portion, the clear area portion being positioned to tint the rays reaching the said screen elements without diffusion of the rays and render the optical impression monochromatic, a pair of rotatably adjustable discs between the said series of screen elements and the eye piece lens having mutual overlapping peripheral portions, the said portion of each disc having a series of apertures adapted to be brought selectively into registration in the relative adjustment of the discs, means whereby the discs may be independently adjusted, transparent screen elements of constant and varying densities arranged in the apertures in said discs and each respectively occupying substantially a half of the respective aperture, the said screen elements being so arranged as to provide for selective overlapping thereof in the focal axis of the lens system in the rotative adjustment of the discs, whereby to receive direct and diffused light rays by the said transmitting and diffusing medium and be tinted in accordance with the composition of their densities, one of said discs having a series of transparencies corresponding in number to its series of apertures and radially opposite the same and bearing indicia indicating time exposure periods of increasing length throughout the series in ratio to the successive increase in density of the screen elements, the other disc having transparencies similarly arranged with respect to the apertures therein and bearing indicia indicating fractions of units of exposure periods of increasing length throughout the series in ratio to the successive increase in density of the screen elements, the transparencies of the two discs, by reason of their position with respect to the apertures of the discs, being adapted to be positioned in the focal plane of the eye piece lens and illuminated and rendered visible by the light rays passing from the light ray diffusing medium and thus indicating automatically the total time period of exposure, and other discs automatically rotated through adjustment of companion ones of the first mentioned discs and having transparencies arranged in annular series and bearing indicia, the indicia of one series of transparencies indicating the class of sensitized medium to be exposed in the camera and the indicia of the other series of transparencies indicating the camera stop, the said transparencies of the last mentioned discs being likewise in the focal plane of the eye piece lens.

GUY E. OSBORNE.